Oct. 27, 1936.   N. E. WELTY ET AL   2,058,539
FERTILIZER DISTRIBUTOR
Filed May 22, 1935

INVENTORS
N. E. Welty
A. J. Locken
BY
ATTORNEY

Patented Oct. 27, 1936

2,058,539

UNITED STATES PATENT OFFICE 2,058,539

FERTILIZER DISTRIBUTOR

Noah E. Welty and Arthur J. Locken, Patterson, Calif.

Application May 22, 1935, Serial No. 22,770

3 Claims. (Cl. 111—73)

This invention relates to fertilizer distributors for use in connection with certain standard seed planting machines having a seed hopper and furrow opening unit which drops the seeds at a certain level below the ground surface.

The principal object of our invention is to provide a fertilizer distributor attachment adapted to be readily connected to the seed hopper and by means of which strips of fertilizer will be deposited in the ground on both sides of and below the seed planting level, without any such fertilizer contacting with the seed. Also, we have provided means for easily adjusting the attachment vertically relative to the hopper so as to alter the relative level at which the fertilizer will be deposited in the ground.

The attachment is thus particularly adapted for use with crops which depend on subsurface irrigation rather than overhead watering, since the fertilizer will always be below and consequently will be acted on by the irrigating water to enrich the ground in the root zone. The distribution of the fertilizer in the form of a pair of transversely spaced strips or rows for each row of seeds also provides a wider feeding zone for the roots than when the fertilizer is distributed in the same transverse plane as the seeds, whether above or below the same.

A further object of the invention is to produce a simple and inexpensive device and yet one which will be exceedingly effective for the purpose for which it is designed. These objects we accomplish by means of such structure and relative arrangement of parts as will fully appear by a perusal of the following specification and claims.

In the drawing similar characters of reference indicate corresponding parts in the several views.

Figure 1:
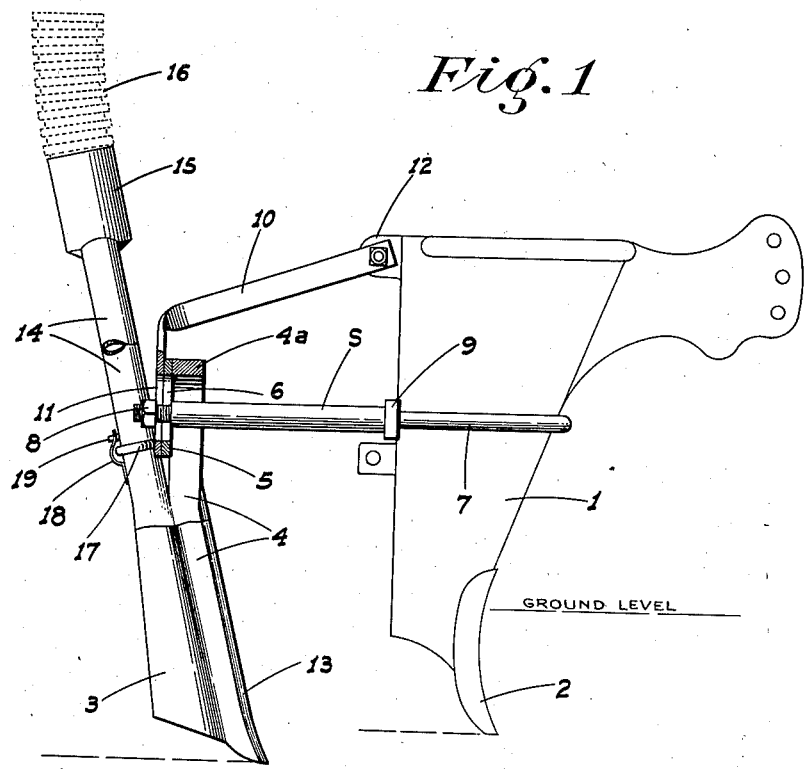
Figure 1 is a side elevation partly in section of our improved fertilizer distributor as connected to a standard form of seed planting boot.
Figure 2:
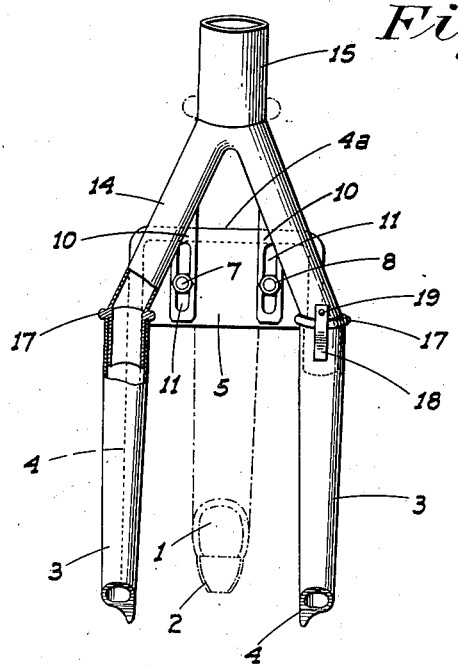
Figure 2 is a rear end view of the same.

Referring now more particularly to the characters of reference on the drawing, the seed planter to which the distributor is attached includes a seed planting boot 1 having a furrow opening blade 2 depending below the same at the front so as to open a seed furrow to a certain depth immediately ahead of the falling seed.

The fertilizer distributor comprises a pair of substantially vertical tube-like conduits 3 spaced apart transversely a certain distance and adapted to be symmetrically disposed relative to the boot and behind the same. The conduits are rigidly connected together as a unit by means of bars 4 of plow steel which extend down the front of the conduits to a point below the same and rigidly welded for their full length thereto, and integrally connected to the top by a cross member 4a which is preferably disposed above the top of the conduits some distance.

Welded on the cross member 4a and on the bars 4 and extending down from the top of said bars a certain distance is a plate 5 having a pair of transversely spaced vertical slots 6. A U-bolt 7 extends rearwardly from about the front of the boot 1, the opposed legs of said bolt passing through the slots 6 and having clamping nuts 8 on their rear ends. The legs of the bolt also pass through a clamping bar 9 engaging the rear side of the boot 1, said legs having spacer sleeves S thereon between the plate 5 and the bar 9. If therefore the nuts 8 are tightened up against the plate, the distributor conduits will be rigidly clamped in connection with the seed boot and yet may be adjusted vertically by reason of the slots 6, so as to alter the level of the bottom of the conduits and bars 4 relative to the blade 2.

In actual practice however said nuts are not directly clamped against the plate 5, but against the down turned extensions of L-shaped brace straps 10, which have slots 11 matching the slots 6. These straps are bent forwardly above the plate 5 of the member 4a and extend to a bolted connection with a lug 12 formed on and projecting rearwardly from the boot 1 at the top. The distributing conduits are thus rigidly held against movement relative to the boot, while having no obstructions from the bottom to a point well above the ground level such as would interfere with the free movement of the distributor through the ground. The bars 4 not only reinforce the relatively thin conduits but also form furrowing opening elements since as stated they project below the bottom of the conduits and are also tapered to a relatively dull edge at the front, as indicated at 13.

Figure 3:
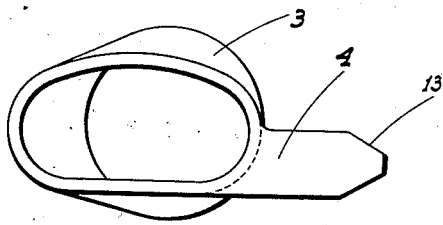
Figure 3 is an enlarged bottom plan view of one of the fertilizer distributing conduits.

The conduits are circular at the top but are flattened so as to be substantially oval shaped at the bottom with their major axes in a plane lengthwise of the travel of the implement. The bars 4 are preferably disposed in inwardly offset relation to such major axes, or so that the inner faces of the bars and the adjacent sides of the conduits are substantially flush or having a stream-line form, as shown in Figure 3. This arrangement offers the least possible resistance to the dirt and prevents the same from possibly jamming up in the relatively restricted area between the conduits.

The conduits at the top receive the lower ends of the upwardly converging legs 14 of the fertilizer feed chute whose top portion 15 is adapted for connection to the usual form of flexible feed pipe 16 leading from the supply hopper. Downward movement into the conduits is limited by integral beads or collars 17 on the legs. Under certain conditions it may be desirable for the legs to have a removable loose fit in the conduits to allow of relative play therebetween. In such cases the legs are held in place in the conduits without interfering with such play by suitable means such as spring clips 18 fixed on the conduits and releasably engaging pins 19 projecting from the chute legs.

The distributor as a whole is designed so that the lower ends of the furrow opening bars 4 will always project below the bottom level of the plate 2, thus insuring the depositing of the fertilizer in the furrows opened by said bars at a level below that of the seed as planted. Since the distributor is rigid with the boot 1, it may be raised or lowered therewith as a unit without disturbing the relative vertical spacing between the seed and distributor and fertilizer furrows. At the same time, as above described, such spacing may be altered at any time by loosening the bolts 8 and adjusting the distributor unit up or down as the case may be.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A fertilizer distributing unit for attachment to a seed planting boot comprising a transversely spaced pair of fertilizer conduits adapted to be disposed in transversely spaced relation to the boot rearwardly thereof, means rigidly connecting the conduits, a vertically disposed plate mounted on said connecting means and having transversely spaced slots, a U-bolt about the boot projecting rearwardly therefrom and through the slots, a bar engaging the rear face of the boot and through which the legs of the bolt pass, spacers on said legs between the bar and plate and nuts on the legs rearwardly of the plate.

2. A fertilizer distributing unit for attachment to a seed planting boot comprising a transversely spaced pair of fertilizer conduits adapted to be disposed in transversely spaced relation to the boot, means connecting the conduits as a rigid unit, said means comprising an inverted U-shaped bar unit the legs of which are secured to and extend downwardly at the front of the conduits to a termination below the same to both brace the conduits and to serve as furrow opening elements and means to secure said unit in rigid connection with the boot.

3. A fertilizer distributing unit for cooperation with a seed planting boot comprising a transversely spaced pair of fertilizer conduits adapted to be disposed in transversely spaced relation to the boot, vertical bars rigid with and projecting lengthwise of the conduits at the front thereof to form furrow opening elements, the adjacent inner faces of the bars being substantially flush with the inner adjacent faces of the conduits, and means to mount the conduits in cooperating relationship with the boot.

NOAH E. WELTY.
ARTHUR J. LOCKEN.